US009613649B1

(12) United States Patent
Shimoda et al.

(10) Patent No.: US 9,613,649 B1
(45) Date of Patent: Apr. 4, 2017

(54) CHANGER APPARATUS FOR DATA LIBRARY APPARATUS CAPABLE OF MOVING RECORDING MEDIA BETWEEN STORING POSITION, AND RECORDER AND PLAYER APPARATUS

(71) Applicant: Panasonic Intellectual Property Management Co., Ltd., Osaka (JP)

(72) Inventors: Daisuke Shimoda, Osaka (JP); Masaru Kaida, Osaka (JP); Motoshi Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/353,080

(22) Filed: Nov. 16, 2016

(30) Foreign Application Priority Data

Mar. 17, 2016 (JP) .................................. 2016-053356

(51) Int. Cl.
  *G11B 17/22* (2006.01)
(52) U.S. Cl.
  CPC .......... *G11B 17/225* (2013.01); *G11B 17/221* (2013.01)
(58) Field of Classification Search
  CPC ..... G11B 17/225; G11B 17/221; G11B 17/22; G11B 17/28
  USPC ....... 720/615, 614, 635, 632, 714, 616, 619, 720/604
  See application file for complete search history.

(56) References Cited

U.S. PATENT DOCUMENTS

| 5,982,719 A * | 11/1999 | Nishijima | G11B 17/30 369/197 |
| 2010/0146526 A1* | 6/2010 | Shin | G11B 17/0282 720/604 |
| 2010/0153978 A1* | 6/2010 | Yoo | G11B 17/0288 720/604 |
| 2013/0263162 A1* | 10/2013 | Yoshida | G11B 17/22 720/615 |
| 2013/0326548 A1* | 12/2013 | Chihara | G11B 17/053 720/615 |
| 2015/0074692 A1* | 3/2015 | Yoshida | G11B 23/0323 720/615 |

FOREIGN PATENT DOCUMENTS

JP  2015-111490 A  6/2015

* cited by examiner

*Primary Examiner* — Allen T Cao
(74) *Attorney, Agent, or Firm* — Renner, Otto, Boisselle & Sklar, LLP

(57) ABSTRACT

The controller selects one command of the plurality of commands included in the command list. The controller selects one magazine that stores therein one recording medium designated by the one selected command, based on the magazine information, the controller moves the one selected magazine between the storing position of the one selected magazine and the plurality of recorder and player apparatuses using the carrier mechanism. The controller extracts all commands designating recording media stored in the one selected magazine, from the command list, based on the magazine information. The controller moves all the recording media designated by the extracted commands between the one selected magazine and the plurality of recorder and player apparatuses using the carrier mechanism.

8 Claims, 15 Drawing Sheets

| | ORIGINATION | DESTINATION |
|---|---|---|
| COMMAND cmd1 | DISC 1-1 | DRIVE 101-1 |
| COMMAND cmd2 | DISC 1-3 | DRIVE 101-3 |
| COMMAND cmd3 | DISC 1-20 | DRIVE 101-4 |
| COMMAND cmd4 | DISC 1-2 | DRIVE 101-2 |
| COMMAND cmd5 | DISC 101-5 | DRIVE 1-21 |

| | LOAD/UNLOAD | DISC NO. | DRIVE NO. |
|---|---|---|---|
| COMMAND cmd1 | LOAD | DISC 1-1 | DRIVE 101-1 |
| COMMAND cmd2 | LOAD | DISC 1-3 | DRIVE 101-3 |
| COMMAND cmd3 | LOAD | DISC 1-20 | DRIVE 101-4 |
| COMMAND cmd4 | LOAD | DISC 1-2 | DRIVE 101-2 |
| COMMAND cmd5 | UNLOAD | DISC 1-21 | DRIVE 101-5 |

Fig.6

| MAGAZINE NO. | MAGAZINE STORING POSITION | | | | DISC NO. WITHIN MAGAZINE |
|---|---|---|---|---|---|
| | MODULE NO. | LAYER NO. | COLUMN NO. | L/R | |
| MAGAZINE 10-1 | 1 | 1 | 1 | LEFT | DISC 1-1 |
| | | | | | DISC 1-2 |
| | | | | | : |
| | | | | | DISC 1-12 |
| MAGAZINE 10-2 | 1 | 1 | 2 | LEFT | DISC 1-13 |
| | | | | | DISC 1-14 |
| | | | | | : |
| | | | | | DISC 1-24 |
| : | : | | | | : |
| MAGAZINE 10-100 | 2 | 1 | 1 | LEFT | DISC 1-121 |
| | | | | | DISC 1-122 |
| | | | | | : |
| | | | | | DISC 1-132 |
| : | : | | | | : |

500

Fig.9
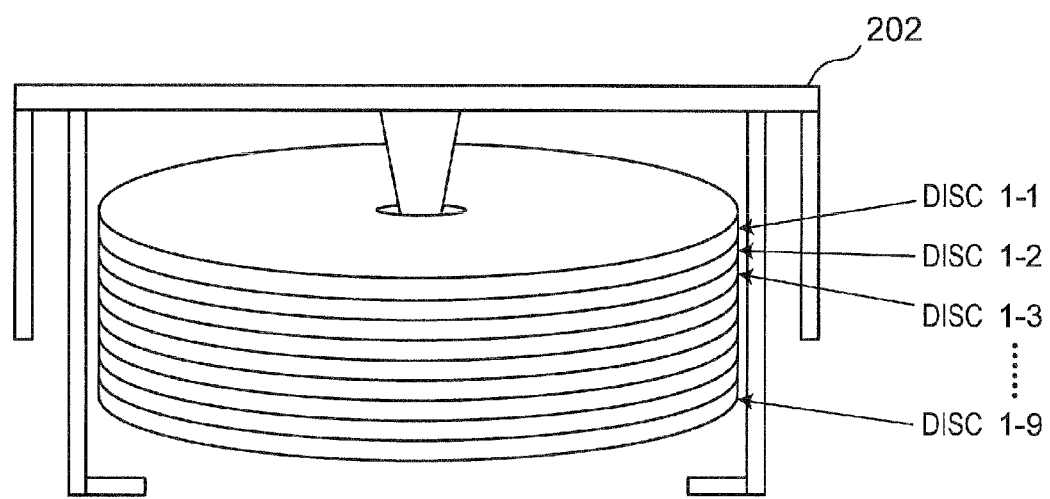
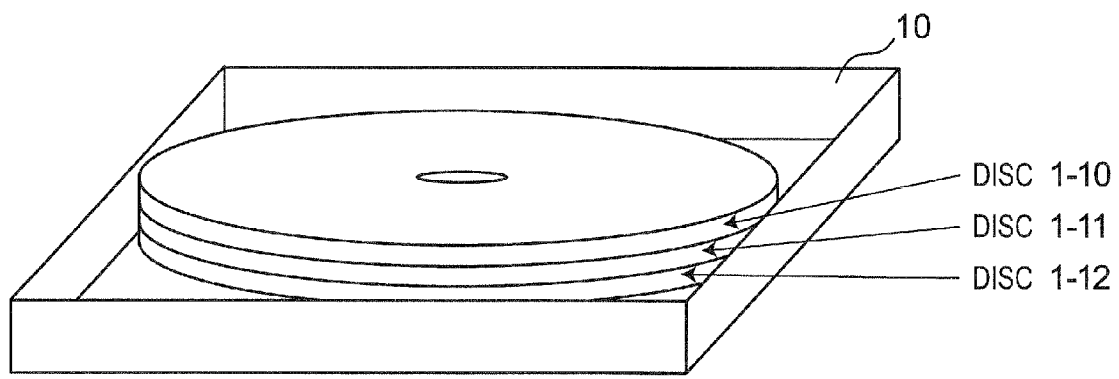

|  | ORIGINATION | DESTINATION |
|---|---|---|
| COMMAND cmd1 | DISC 1-1 | DRIVE 101-1 |
| COMMAND cmd2 | DISC 1-3 | DRIVE 101-3 |
| COMMAND cmd4 | DISC 1-2 | DRIVE 101-2 |

|  | ORIGINATION | DESTINATION |
|---|---|---|
| COMMAND cmd2 | DISC 1-3 | DRIVE 101-3 |
| COMMAND cmd4 | DISC 1-2 | DRIVE 101-2 |
| COMMAND cmd1 | DISC 1-1 | DRIVE 101-1 |

CHANGER APPARATUS FOR DATA LIBRARY APPARATUS CAPABLE OF MOVING RECORDING MEDIA BETWEEN STORING POSITION, AND RECORDER AND PLAYER APPARATUS

BACKGROUND

1. Technical Field

This disclosure relates to a changer apparatus for a date library apparatus including a plurality of recorder and player apparatuses and a plurality of portable recording media, where the changer apparatus moves each of the recording media between its storing position and any one of the recorder and player apparatus. This disclosure also relates to a data library apparatus including the changer apparatus.

2. Description of Related Art

Recently, the amount of data stored in a large-scale data center has rapidly increases, and accordingly, the amount of rarely retrieved data tends to also increases. A data library apparatus, which records the rarely retrieved data into a plurality of portable recording media stored in storing positions, has caught attention. The data library apparatus includes a changer apparatus including a carrier mechanism for moving each of the recording media between its storing position, and the recorder and player apparatus. The data can be stored for a long term with low electric power consumption, by using the recording media, such as optical discs.

As typical portable information storage media, optical discs have been known, such as a digital versatile disc (DVD) and Blu-ray (a registered trademark) disc (hereinafter, described as "BD"), etc. The optical discs are roughly classified into rewritable information storage media, such as DVD-RAM and BD-RE, and write-once information storage media, such as DVD-R, DVD+R, and BD-R. In addition, a new optical disc with an increased recording capacity over that of BD has been developed. Since the optical disc can store data for 50 years or longer, the optical disc is advantageous to a hard disc drive apparatus (HDD) or a magnetic tape (such as Linear Tape-Open).

With the recent increase in the capacity of the optical disc, the write-once optical discs which are less expensive than the rewritable optical discs have been increasingly used for archiving rarely retrieved data. As a data library apparatus using optical discs for archives and the like, an apparatus has been proposed that includes a plurality of optical disc drives, and handles a plurality of optical discs put into cartridge cases (hereinafter, referred to as "magazines"). For example, see Japanese Laid-Open Patent Publication JP 2015-111490 A.

SUMMARY

A conventional data library apparatus moves a recording medium between its storing position, and a recorder and player apparatus using a carrier mechanism of a changer apparatus, every time the data library apparatus receives a command to load or unload the recording medium on/from the recorder and player apparatus. Per one movement of the recording medium, the number of operations of the carrier mechanism increases, and the movement distance of the carrier mechanism also increases. Therefore, the possibility increases that the carrier mechanism is worn and fails.

One non-limiting and exemplary embodiment provides a changer apparatus for a data library apparatus having longer lifetime than that of the conventional data library apparatus by reducing the number of operations of a carrier mechanism and reducing the movement distance of the carrier mechanism.

A changer apparatus according to one aspect of the present disclosure is a changer apparatus for a data library apparatus that includes a plurality of recorder and player apparatuses and a plurality of recording media stored in a plurality of magazines. Each of the plurality of magazines are stored at a predetermined storing position of the data library apparatus. The changer apparatus includes a carrier mechanism, a receiving circuit, a memory, and a controller. The carrier mechanism moves one selected magazine of the plurality of magazines between the storing position of the one selected magazine and the plurality of recorder and player apparatuses, and moves at least one recording medium stored in the one selected magazine between the one selected magazine and the plurality of recorder and player apparatuses. The receiving circuit receives a plurality of commands including a load command to load one of the plurality of recording media on one of the plurality of recorder and player apparatuses, and an unload command to unload one of the plurality of recording media from one of the plurality of recorder and player apparatuses. The memory retains a command list including contents of the plurality of commands, and retains magazine information including the storing positions of the plurality of magazines and identification information on the plurality of recording media stored in the plurality of magazines. The controller controls the carrier mechanism based on the command list and the magazine information. The controller selects one command of the plurality of commands included in the command list. The controller selects one magazine that stores therein one recording medium designated by the one selected command, based on the magazine information, the controller moves the one selected magazine between the storing position of the one selected magazine and the plurality of recorder and player apparatuses using the carrier mechanism. The controller extracts all commands designating recording media stored in the one selected magazine, from the command list, based on the magazine information. The controller moves all the recording media designated by the extracted commands between the one selected magazine and the plurality of recorder and player apparatuses using the carrier mechanism.

The changer apparatus of this disclosure is effective for providing the data library apparatus having longer lifetime than that of the conventional data library apparatus by reducing the number of operations of the carrier mechanism and reducing the movement distance of the carrier mechanism.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 6 is a diagram of magazine information 500 according to the first embodiment.

FIG. 9 is a diagram for explaining an operation to put the discs 1 into drives 101 by a disc carrier mechanism 202 according to the first embodiment.

DETAILED DESCRIPTION

From now on, embodiments will be described in detail with reference to the drawings as needed. It is noted that unnecessarily detailed descriptions may be omitted. For example, detailed descriptions of well-known facts and repeated descriptions of substantially the same elements may be omitted. This is used for the purpose of avoiding unnecessary redundancy of the following description and facilitating understanding by those skilled in the art.

The accompanying drawings and the following description are provided for sufficient understanding of this disclosure by those skilled in the art, and it is not intended to limit the subject matter described in claims thereto.

In the embodiments in this disclosure, an optical disc is described as an exemplary recording medium.

First Embodiment

The first embodiment will be described with reference to FIGS. 1 to 11.

(1) Magazine 10

Figure 1:
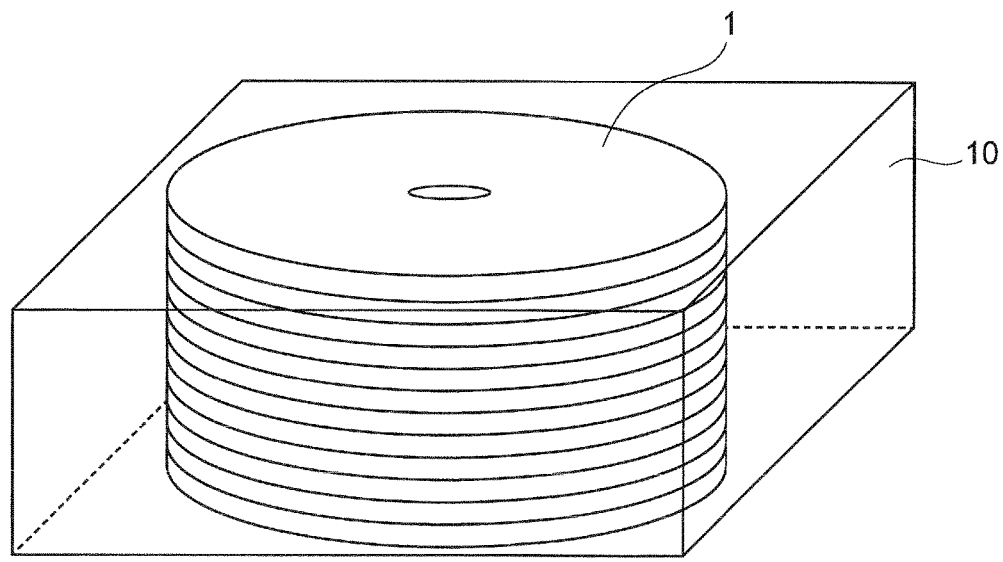
FIG. 1 is a schematic diagram of a magazine 10 storing therein a plurality of discs 1 according to a first embodiment.

FIG. 1 is a schematic diagram of a magazine 10 storing therein a plurality of discs 1 according to the first embodiment. The disc 1 is, for example, an optical disc recording medium. As shown in FIG. 1, the plurality of discs 1 are stored in the magazine 10. In this embodiment, it is assumed that twelve discs 1 are stored in one magazine 10. For example, the magazine 10 has no tray disposed therein in order to increase density and capacity, and the plurality of discs 1 are stored using the direct stack method by which the plurality of discs 1 are directly stacked on each other. FIG. 1 shows only exemplary form and shape of the magazine 10, and any form and any shape may be employed as long as the plurality of optical discs can be stored.

(2) Optical Disc Library Apparatus 200

Figure 2:
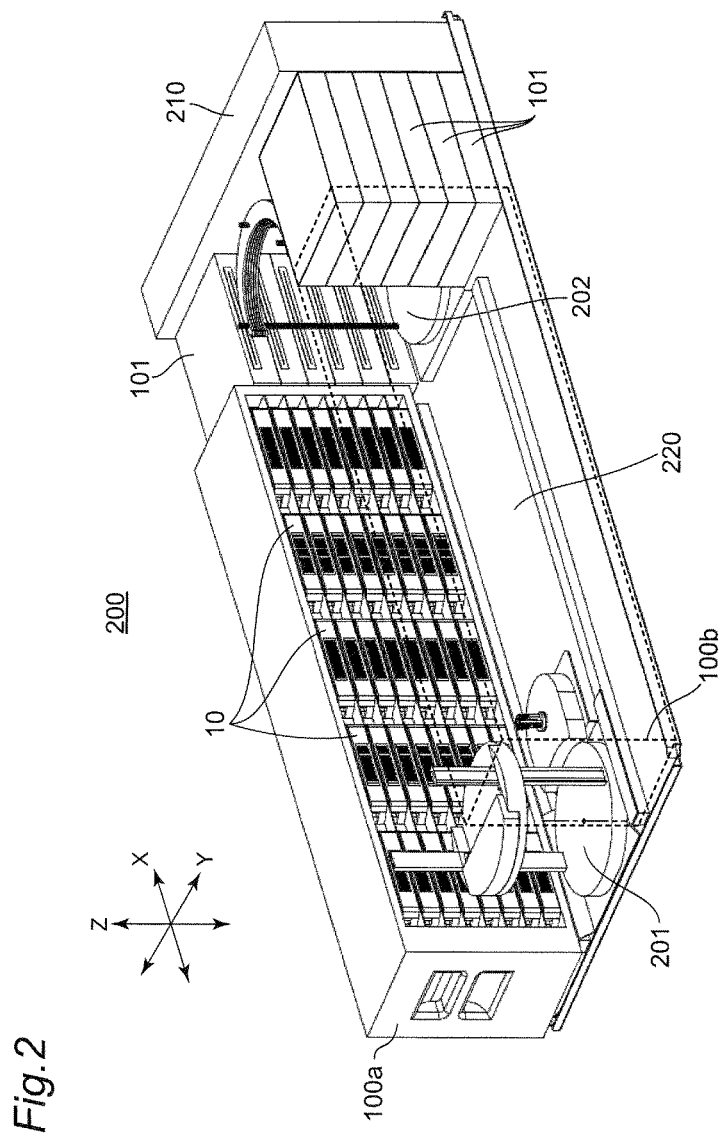
FIG. 2 is a perspective diagram of an example of an optical disc library apparatus 200 according to the first embodiment.

FIG. 2 is a perspective diagram of an example of an optical disc library apparatus 200 according to the first embodiment. As shown in FIG. 2, the optical disc library apparatus 200 is a data library apparatus, including magazine racks 100a and 100b each storing a plurality of magazines 10, a plurality of optical disc drives 101 (hereinafter, also referred to as "drives 101"), and a changer apparatus 220. The changer apparatus 220 includes a magazine carrier mechanism 201, a disc carrier mechanism 202, and a control device 210.

Each of the magazine racks 100a and 100b includes a plurality of magazine holders, as predetermined storing positions to store the plurality of magazines 10. The plurality of magazine holders are arranged to form a plurality of layers in the vertical direction and a plurality of rows in the horizontal direction. The magazine racks 100a and 100b are arranged such that the magazine carrier mechanism 201 is positioned therebetween. For example, the magazine rack 100a will be referred to as a "left" magazine rack, and the magazine rack 100b will be referred to as a "right" magazine rack. Although only the magazine rack 100a is shown by solid lines in FIG. 2, the magazine rack 100b is also configured in a manner similar to that of the magazine rack 100a. The magazine racks 100a and 100b will hereinafter be collectively referred to as "magazine racks 100".

Each of the drives 101 is a recorder and player apparatus for recording and playing information into/from the one disc 1. In this embodiment, it is assumed that the optical disc library apparatus 200 includes twelve drives 101.

The magazine carrier mechanism 201 is a first carrier mechanism for moving one selected magazine 10 of the plurality of magazines 10 between the storing position of the one selected magazine 10 and the plurality of drives 101. For example, the disc carrier mechanism 202 is disposed in the vicinity of the plurality of drives 101, and a hand-over position for the disc 1 is disposed in the vicinity of the disc carrier mechanism 202. The "hand-over position" refers to a position at which the magazine carrier mechanism 201 and the disc carrier mechanism 202 can hand over the disc 1 with each other. When the magazine carrier mechanism 201 is positioned at the front of each of the magazine holders, the magazine carrier mechanism 201 can pick up the magazine 10 stored in the magazine holder from the magazine rack 100, and store the magazine 10 into the magazine holder. The magazine carrier mechanism 201 can move between the front of each of the magazine holders of the magazine racks 100 and the hand-over position.

When the magazine carrier mechanism 201 loads one disc 1 on one drive 101, the magazine carrier mechanism 201 moves the magazine 10 which stores the disc 1, from its storing position to the hand-over position. When the magazine carrier mechanism 201 unloads one disc 1 from one drive 101, the magazine carrier mechanism 201 moves the magazine 10 which previously stored the disc 1 (that is, the magazine 10 having a free space corresponding to the disc 1), from its storing position to the hand-over position.

The disc carrier mechanism 202 is a second carrier mechanism for moving at least one disc 1 stored in the one selected magazine 10 between the one selected magazine 10 and the plurality of drives 101. The disc carrier mechanism 202 can move between the hand-over position and the front of each of the drives 101. When the magazine carrier mechanism 201 and the disc carrier mechanism 202 are positioned at the hand-over position, the disc carrier mechanism 202 can pick up the disc 1 from the magazine 10 being held by the magazine carrier mechanism 201, and store the disc 1 into the magazine 10 being held by the magazine carrier mechanism 201. When the magazine carrier mechanism 201 is positioned at the front of each of the drives 101, the magazine carrier mechanism 201 can put and pick up the disc 1 into/from the drive 101.

When the magazine 10 storing at least one disc 1 to be loaded on the drive 101 is positioned at the hand-over position, the disc carrier mechanism 202 receives the discs 1 to be loaded, which are stored in the magazine 10, at the hand-over position at the same time, and puts the discs 1 one by one into arbitrary drives 101. When the magazine 10 having a free space corresponding to the at least one disc 1 to be unloaded from the drive 101 is positioned at the hand-over position, the disc carrier mechanism 202 picks up the discs 1 one by one from arbitrary drives 101, and stores the discs 1 into the magazine 10 at the same time.

When storing and picking up of the discs 1 into/from the magazine 10 are completed by the disc carrier mechanism 202, the magazine carrier mechanism 201 moves the magazine 10 from the hand-over position to its storing position.

The control device 210 controls the magazine carrier mechanism 201 and the disc carrier mechanism 202 as described below.

The optical disc library apparatus according to the embodiment is not limited to include the two magazine racks 100a and 100b. One or more modules, each module including two magazine racks similar to the magazine racks 100a and 100b of FIG. 2, may be stacked on or beneath the optical disc library apparatus 200 of FIG. 2. The optical disc library apparatus 200 itself of FIG. 2 is also configured as a module. The magazine carrier mechanism 201 moves the magazine 10 stored in any one of the modules between its storing position and the hand-over position in the vicinity of the disc carrier mechanism 202. Thus, it is possible to increase the recording capacity of the optical disc library apparatus.

(3) Configuration of Optical Disc Library System

Figure 3:
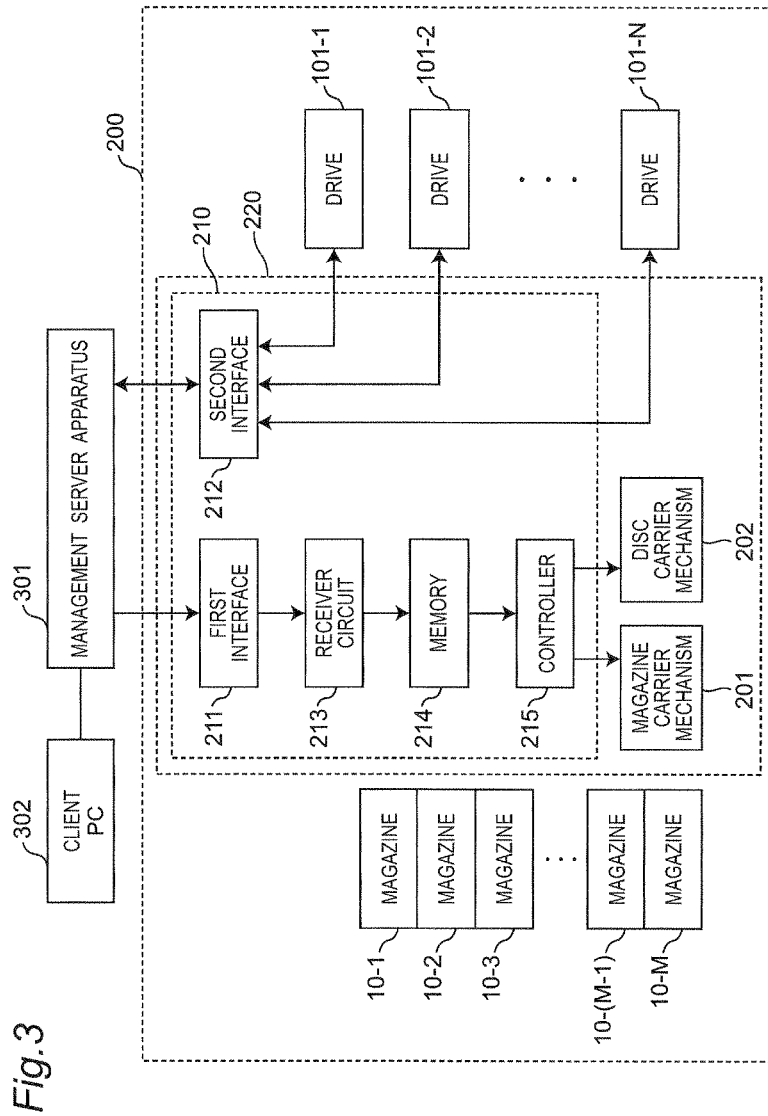
FIG. 3 is a block diagram of an example of an optical disc library system according to the first embodiment.

FIG. 3 is a block diagram of an example of an optical disc library system according to the first embodiment. The optical disc library system of FIG. 3 includes the optical disc library apparatus 200, a management server apparatus 301, and at least one client personal computer (client PC) 302.

The management server apparatus 301 controls the optical disc library apparatus 200. The client PC 302 is connected to the management server apparatus 301 through a network, such as a LAN. The client PC 302 accesses the optical disc library apparatus 200 through the management server apparatus 301, and instructs to load and unload specific discs 1 and instructs to record and play information.

As described with reference to FIG. 2, the optical disc library apparatus 200 includes the plurality of magazines 10 stored in the magazine racks 100, the plurality of drives 101, and the changer apparatus 220. Hereinafter, the plurality of magazines 10 will be denoted by reference numerals "10-1", "10-2", . . . , and "10-M", and the plurality of drives 101 will be denoted by reference numerals "100-1", "100-2", . . . , and "100-N". As described with reference to FIG. 2, the changer apparatus 220 includes the magazine carrier mechanism 201, the disc carrier mechanism 202, and the control device 210.

As shown in FIG. 3, the control device 210 includes a first interface 211, a second interface 212, a receiving circuit 213, a memory 214, and a controller 215.

As shown in FIG. 3, the optical disc library apparatus 200 is connected to the management server apparatus 301 through the first interface 211 and the second interface 212 serving as host interfaces.

The first interface 211 is an interface by which the management server apparatus 301 communicates with and controls the optical disc library apparatus 200. For example, an Internet small computer system interface (iSCSI), a USB, or the like is available for the first interface 211.

The second interface 212 is an interface by which the management server apparatus 301 communicates with and controls the drives 101 in the optical disc library apparatus 200. For example, a serial attached SCSI (SAS), the iSCSI, a fiber channel (FC), a serial ATA (SATA), or the like is available for the second interface 212. The management server apparatus 301 is connected to all the drives 101 through the second interface 212 so as to be able to separately control each of all the drives 101. The second interface 212 may include an SAS-SATA conversion circuit board and the like. In this case, the management server apparatus 301 may be connected to the second interface 212 of the optical disc library apparatus 200 by the SAS, and in the optical disc library apparatus 200, the second interface 212 may be connected to the drives 101 by the SATA.

The receiving circuit 213 receives a plurality of commands from the management server apparatus 301 through the first interface 211, the plurality of commands including a load command to load one of the plurality of discs 1 on one of the plurality of drives 101, and an unload command to unload one of the plurality of discs 1 from one of the plurality of drives 101. Each of the commands includes a plurality of transport parameters indicating the content of the loading or unloading. The receiving circuit 213 generates a command list 400 (described below with reference to FIGS. 4 and 5) including the contents of the plurality of commands, based on information on the disc 1 and the drive 101 designated by the command, and stores the command list 400 into the memory 214. Each line of the command list 400 corresponds to the transport parameters included in one command. The receiving circuit 213 receives magazine information 500 from the management server apparatus 301 through the first interface 211, the magazine information 500 (described below with reference to FIG. 6) including the storing positions of the plurality of magazines 10 and identification information on the plurality of discs 1 stored in the plurality of magazines 10, and stores the magazine information into the memory 214.

The memory 214 retains the command list 400 and the magazine information 500.

The controller 215 controls the magazine carrier mechanism 201 and the disc carrier mechanism 202 based on the command list and the magazine information. The controller 215 extracts all the commands instructing to load or unload the discs 1 included in the same magazine 10, from the command list 400 stored in the memory 214, based on the magazine information 500. According to the extracted commands, the controller 215 instructs the magazine carrier mechanism 201 to transport the magazine 10, and instruct the disc carrier mechanism 202 to put and pick up the discs 1 into/from the drives 101.

Figure 4:
FIG. 4 is a diagram of a command list 400 according to the first embodiment.

FIG. 4 is a diagram of the command list 400 according to the first embodiment. As shown in FIG. 4, each line of the command list 400 (each of the commands cmd1 to cmd5) includes transport parameters including a disc number or a drive number as an origination, and a disc number or a drive number as a destination. In FIG. 4 and hereinafter, the n-th disc 1 will be denoted as "disc 1-n". The transport parameters including a disc number as an origination and a drive number as a destination indicate that a magazine 10 is to be picked up from the magazine rack 100 and a disc 1 in the magazine 10 is to be put into a drive 101 (loading). The transport parameters including a drive number as an origination and a disc number as a destination indicate that a disc 1 is to be picked up from a drive 101, the disc 1 is returned to the magazine 10, and the magazine 10 is stored in the magazine rack 100 (unloading).

Figure 5:
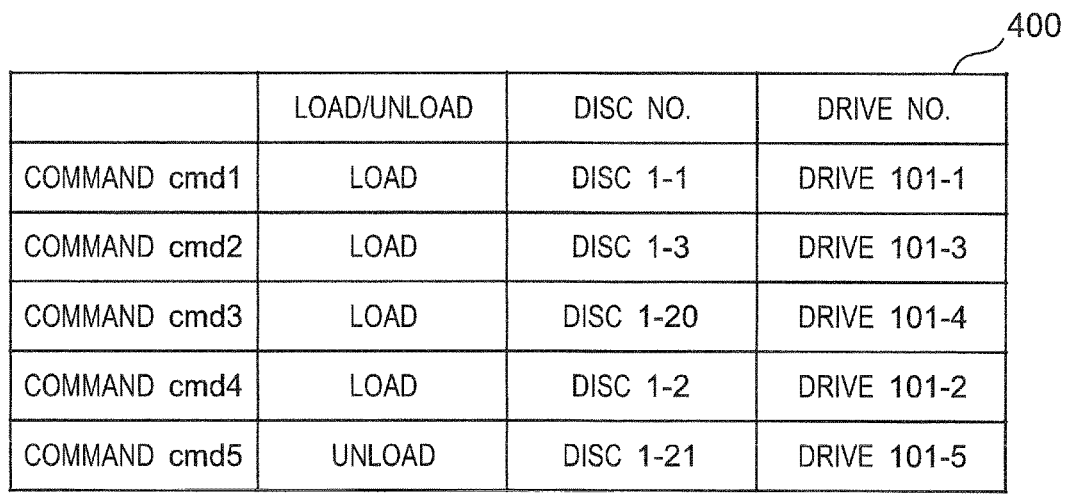
FIG. 5 is a diagram of a command list 400 according to an exemplary modification of the first embodiment.

FIG. 5 is a diagram of the command list 400 according to an exemplary modification of the first embodiment. As shown in FIG. 5, each of the transport parameters included in the command list 400 may include information indicative of loading or unloading, a disc number, and a drive number.

In the command lists 400 of FIGS. 4 and 5, the commands cmd1 to cmd5 are recorded in, for example, order of receiving the plurality of commands by the receiving circuit 213.

FIG. 6 is a diagram of the magazine information 500 according to the first embodiment. The magazine information 500 indicates the correspondence between the discs 1 and the magazines 10. As shown in FIG. 6, the magazine information 500 includes magazine numbers, magazine storing positions, and disc numbers within magazine. In FIG. 6 and hereinafter, the m-th magazine 10 will be denoted as "magazine 10-$m$". The magazine storing position is information indicating the physical position of the magazine holder storing the magazine 10. The disc number within magazine indicates the disc numbers (the identification information) of the discs 1 stored in the magazine 10. The order of the discs as indicated in "disc numbers within magazine" indicates the physical position in the magazine 10 (the information indicating, for example, an order from the uppermost disc).

The "magazine storing position" of FIG. 6 indicates that of the case where the one or more modules each including the two magazine racks is/are stacked on the optical disc library apparatus 200 of FIG. 2. In this case, the magazine storing position is indicated by a module number identifying one module, a layer number, a column number, and a right/left magazine rack, each identifying the position of a magazine holder in the one module. FIG. 6 shows that, for example, the magazine 10-1 is stored at the magazine storing position of (module number, layer number, column number, right/left)=(1, 1, 1, left), and stores the discs 1-1 to 1-12 ordered from top to bottom.

Based on this magazine information 500, the controller 215 identifies the magazine 10 storing the disc 1 designated from the management server apparatus 301, the physical position of the disc 1 in the magazine 10 (for example, information indicating an order from the uppermost disc), and the magazine storing position in the magazine rack 100 storing the magazine 10. The magazine information 500 is stored in the memory 214 during initialization or setting up of the optical disc library apparatus 200.

(4) Disc Transport Process

Figure 7:
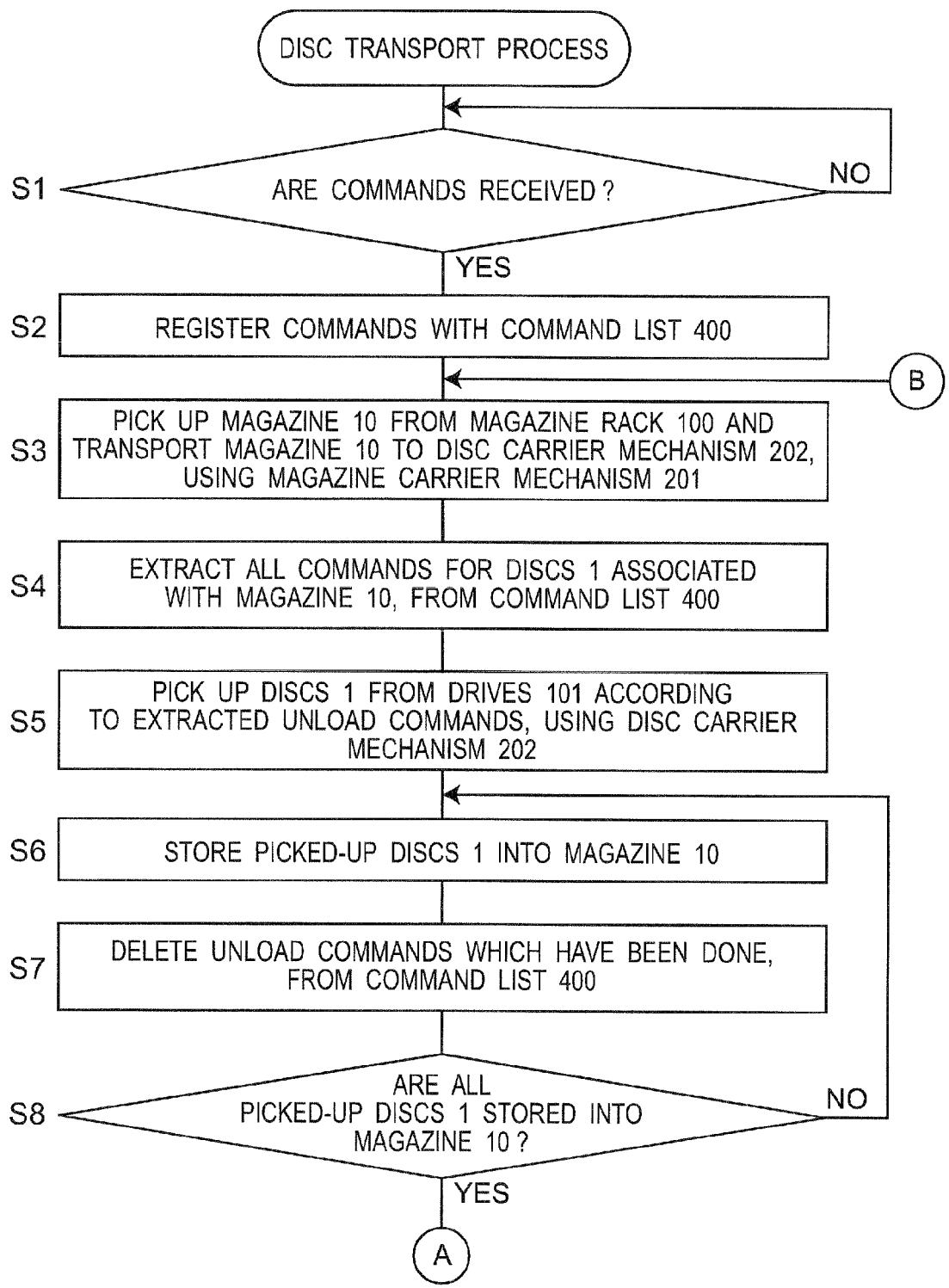
FIG. 7 is a flowchart of a first portion of a disc transport process according to the first embodiment.
Figure 8:
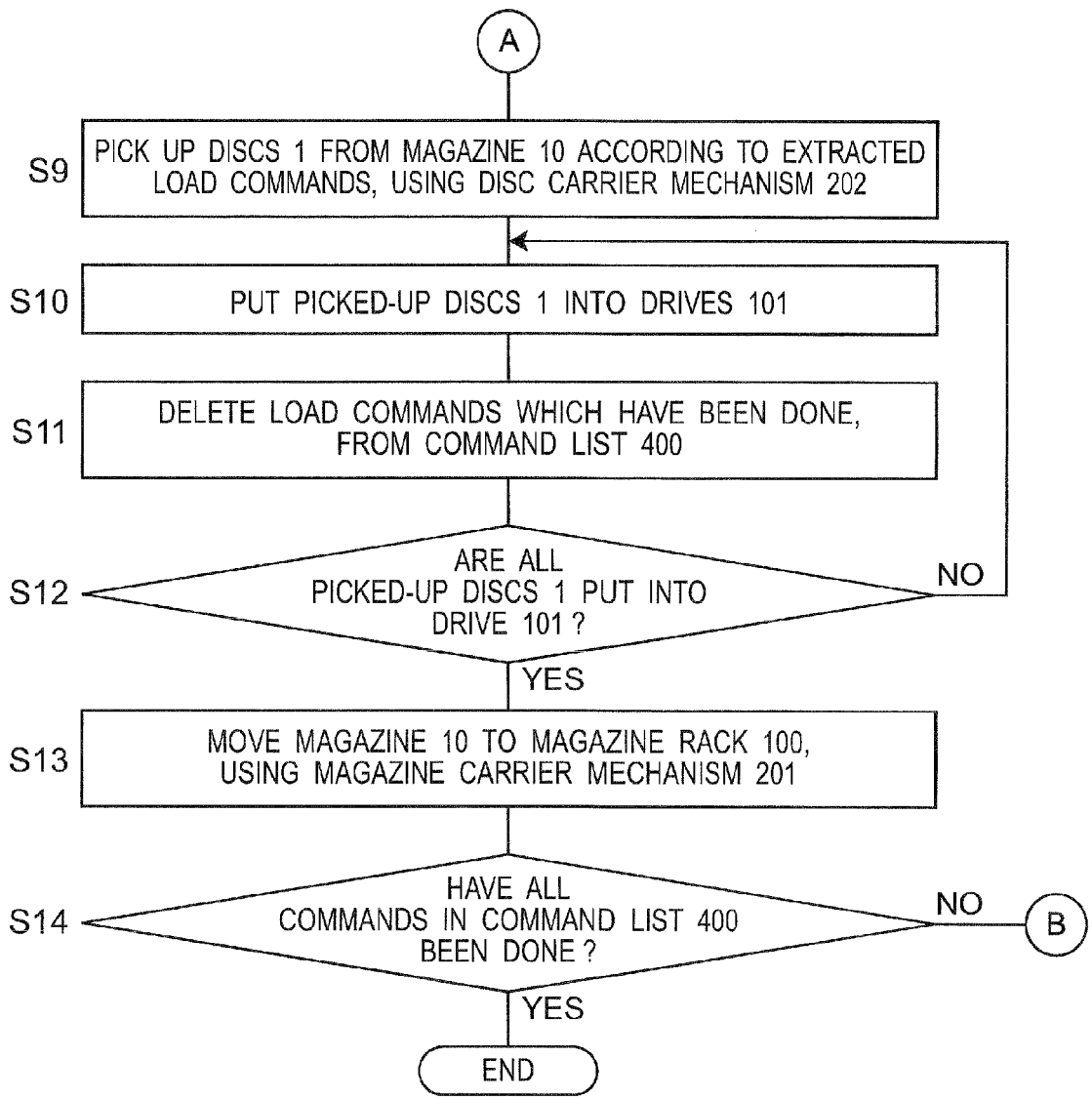
FIG. 8 is a flowchart of a second portion of the disc transport process according to the first embodiment.

FIG. 7 is a flowchart of a first portion of a disc transport process according to the first embodiment. FIG. 8 is a flowchart of a second portion of the disc transport process according to the first embodiment. The flowchart of FIGS. 7 and 8 shows the procedure for loading or unloading the discs 1 on/from the drives 101 according to this embodiment. A case is described where the plurality of commands are received from the management server apparatus 301.

Step S1: The receiving circuit 213 waits for the commands from the management server apparatus 301. In this embodiment, the management server apparatus 301 transmits the plurality of commands to the optical disc library apparatus 200, at the same time. The receiving circuit 213 determines whether or not the receiving circuit 213 has received the commands; if YES, the process proceeds to step S2; if NO, the process repeats step S1.

Step S2: The receiving circuit 213 registers the commands with the command list 400. The receiving circuit 213 generates the command list 400 based on the transport parameters designated in the commands, and stores the command list 400 into the memory 214.

Step S3: When the controller 215 detects that the command list 400 is generated in the memory 214, the controller 215 selects one command of the plurality of commands included in the command list. For example, the controller 215 may select a command registered at the top of the command list 400. One disc is designated by the disc number of the transport parameters of this command. Based on the magazine information 500, the controller 215 selects one magazine 10 storing the one disc 1 designated by the one selected command. The controller 215 instructs the magazine carrier mechanism 201 to move the selected magazine 10. The magazine carrier mechanism 201 picks up the selected magazine 10 from the magazine holder of the magazine rack 100, and moves the picked-up magazine 10 to the hand-over position in the vicinity of the disc carrier mechanism 202.

Step S4: Based on the magazine information 500, the controller 215 extracts all the commands designating discs 1 stored in the one selected magazine 10, from the command list 400. The controller 215 determines the order of executing the commands so as to reduce the movement distance of the disc carrier mechanism 202. The step of extracting and reordering the commands will be further described below with reference to FIGS. 9 and 10.

When the commands extracted at step S4 include unload commands, the controller 215 executes the unload commands at steps S5 to S8. The controller 215 moves all the discs 1 designated by the extracted commands from at least one drive 101 to the one selected magazine 10, using the disc carrier mechanism 202.

Step S5: The controller 215 picks up the discs 1 from the drives 101 according to the extracted unload commands, using the disc carrier mechanism 202. The controller 215 instructs the disc carrier mechanism 202 to pick up the discs 1 from the drives 101 according to the transport parameters of the unload commands. The disc carrier mechanism 202 picks up the designated discs 1 from the designated drives 101.

Step S6: The controller 215 stores the discs 1 picked up from the drives 101, into the magazine 10, using the disc carrier mechanism 202. The disc carrier mechanism 202 stores the picked-up disc into the magazine 10 by the collaborative operation of the magazine carrier mechanism 201 and the disc carrier mechanism 202.

Step S7: The controller 215 deletes the unload commands which have been done, from the command list 400. Thus, unprocessed commands remain in the command list 400.

Step S8: The controller 215 determines whether or not all the discs 1 picked up from the drive 101 are stored into the magazine 10; if YES, the process proceeds to step S9; if NO, the process returns to step S6.

When the commands extracted at step S4 include load commands, the controller 215 executes the load commands using the disc carrier mechanism 202 at steps S9 to S12. The controller 215 moves all the discs 1 designated by the extracted commands from the one selected magazine 10 to at least one drive 101, using the disc carrier mechanism 202.

Step S9: The controller 215 picks up the discs 1 from the magazine 10 according to the extracted load commands, using the disc carrier mechanism 202. The disc carrier mechanism 202 receives all or some of the discs 1 stored in the magazine 10 from the magazine carrier mechanism 201 by the collaborative operation of the magazine carrier mechanism 201 and the disc carrier mechanism 202.

Step S10: The controller 215 puts the discs 1 picked out from the magazine 10, into the drives 101. The controller 215 selects one of the extracted load commands and instructs the disc carrier mechanism 202 to put the one disc 1 into the drive 101 according to the transport parameters of the selected load command. The disc carrier mechanism 202 puts the designated disc 1 into the designated drive 101.

Step S11: The controller 215 deletes the load commands which have been done, from the command list 400. Thus, unprocessed commands remain in the command list 400.

Step S12: The controller 215 determines whether or not all the discs 1 picked up from the magazine 10 are put into the drives 101; if YES, the process proceeds to step S13; if NO, the process returns to step S10.

Step S13: The controller 215 moves the magazine 10 to return the magazine 10 from the hand-over position in the vicinity of the disc carrier mechanism 202 to the magazine holder of the magazine rack 100, using the magazine carrier mechanism 201. The controller 215 instructs the magazine carrier mechanism 201 to return the magazine 10 at the hand-over position to its original position in the magazine rack 100. By the collaborative operation of the magazine carrier mechanism 201 and the disc carrier mechanism 202, the disc carrier mechanism 202 delivers all the discs 1 being held, to the magazine 10 carried by the magazine carrier mechanism 201. The magazine carrier mechanism 201 returns the magazine 10 to the magazine rack 100.

Step S14: The controller 215 determines whether or not all the commands in the command list 400 has been done (i.e., whether or not the command list 400 is empty); if YES, the process ends; if NO, the process returns to step S3. When the process returns to step S3, the controller 215 repeats the same steps for the commands remaining in the command list 400.

For example, when the receiving circuit 213 generates at step S2 the command list 400 as shown in FIG. 4, and the controller 215 selects at step S3 the command registered at the top of the command list 400 as shown in FIG. 4, the disc transport process is executed as follows. The command registered at the top of the command list 400 as shown in FIG. 4 is the load command including the disc 1-1 as the transport parameter. At step S3, the magazine carrier mechanism 201 moves the magazine 10-1 including the disc 1-1 from the magazine holder to the hand-over position in the vicinity of the disc carrier mechanism 202. At step S4, the controller 215 extracts the commands cmd1, cmd2, and cmd4 from the command list 400, and reorders these commands into an order of the commands cmd2, cmd4, and cmd1 (that is, an order of the discs 1-3, 1-2, and 1-1). Because the commands cmd1, cmd2, and cmd4 are all load commands, then steps S9 to S12 are executed. At step S9, the disc carrier mechanism 202 receives the discs 1-3, 1-2, and 1-1 from the magazine 10-1 which has been moved by the magazine carrier mechanism 201 to the hand-over position. By repeating steps S10 to S12, the controller 215 puts the discs 1-3, 1-2, and 1-1 into the drives 101-3, 101-2, and 101-1 indicated by the transport parameters of the commands cmd1, cmd2, and cmd4, respectively, in this order, using the disc carrier mechanism 202. At step S11, the controller 215 deletes the commands cmd1, cmd2, and cmd4 from the command list 400. At step S13, the disc carrier mechanism 202 has put all the discs 1-1, 1-2, and 1-3 picked up from the magazine 10-1 into the drives 101. Therefore, the disc carrier mechanism 202 does not hold any disc 1 to be returned to the magazine 10. Therefore, the magazine carrier mechanism 201 simply returns the magazine 10-1 to the magazine rack 100. At step S14, the command list 400 includes the remaining commands cmd3 and cmd5, and therefore, the process returns to step S3. In the second execution of step S3 and its subsequent steps, the controller 215 executes the same processing for the magazine 10-2 storing the discs 1-20 and 1-21 indicated by the transport parameters of the commands cmd3 and cmd5.

According to the above procedure, it is possible to transport necessary discs 1 by shuttling the magazine carrier mechanism 201 only once between the magazine rack 100 and the hand-over position, by loading and unloading the discs stored in the same magazine 10 at the same time.

(5) Determination of Order of Transporting Discs

Next, a process is described in order to determine the order of loading or unloading the plurality of discs 1 on/from the plurality of drives 101 so as to minimize the movement distance of the disc carrier mechanism 202, when extracting the plurality of commands to load or unload the discs 1 at step S4 of FIG. 7.

FIG. 9 is a diagram for explaining an operation to put the discs 1 into the drives 101 by the disc carrier mechanism 202 according to the first embodiment. For example, when putting the disc 1-9 into the drive 101-1, the disc carrier mechanism 202 lifts up the discs 1-1 to 1-9, leaving the discs 1-10 to 1-12 in the magazine 10. The disc carrier mechanism 202 puts the lowermost disc 1-9 into the drive 101-1. For example, thereafter, when putting the disc 1-3 into the drive 101-2, the disc carrier mechanism 202 returns the lower five discs of the discs 1-1 to 1-8 being held, i.e., the discs 1-4 to 1-8. Thus, the disc carrier mechanism 202, which is holding the discs 1-1 to 1-3, puts the lowermost disc 1-3 into the drive 101-2.

With the disc carrier mechanism 202 configured as above, it is possible to reduce the movement distance of the disc carrier mechanism 202 for putting the discs 1 into the drives 101, by sequentially putting the discs 1 stored in the magazine 10 into the drive 101, from the lowermost disc 1. It is also possible to reduce the duration for putting the discs 1 into the drives 101.

Figure 10:
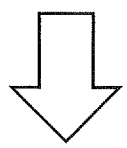
FIG. 10 is a table showing an example in which an order of executing commands cmd1, cmd2, and cmd4 extracted from the command list 400 of FIG. 4 is determined so as to minimize a movement distance of the disc carrier mechanism 202 to pick up the discs 1 from the magazine 10 and put into the drives 101.

FIG. 10 is a table showing an example in which an order of executing the commands cmd1, cmd2, and cmd4 extracted from the command list 400 of FIG. 4 is determined so as to minimize the movement distance of the disc carrier mechanism 202 to pick up the discs 1 from the magazine 10 and put into the drives 101. FIG. 10 shows the example where the commands to put the discs 1 stored in the same magazine as that of the disc 1-1 into the drives 101 are extracted from the command list 400 of FIG. 4, the order of putting the discs 1 into the drives 101 is determined so as to minimize the movement distance of the disc carrier mechanism 202, and accordingly, the commands are reordered. In order to minimize the movement distance of the disc carrier mechanism 202 configured as above, the disc carrier mechanism 202 sequentially puts the discs 1 stored in the magazine 10 into the drive 101, from the lowermost disc 1. For example, at step S4, the controller 215 first refers to the magazine information 500, and identifies the discs 1 stored in the magazine 10 including the disc 1-1. According to the magazine information 500 as shown in FIG. 6, the controller 215 recognizes that the magazine 10-1 including the disc 1-1 stores the discs 1-1 to 1-12 ordered from top to bottom. The controller 215 extracts the command to load or unload any one of the discs 1-1 to 1-12, from the command list 400. As a result, the load commands cmd1, cmd2, and cmd4 are extracted. In this case, if the commands are not reordered, the disc 1-1, 1-3, and 1-2 are to be put into the drives 101 in this order. The controller 215 reorders the commands so as to put the discs 1 stored in the magazine 10-1 into the drives 101, from the lowermost disc 1. As a result, the order of putting the discs 1 into the drives 101 is set to be the disc 1-3, 1-2, and 1-1.

As above, the controller 215 moves the discs 1 designated by the extracted commands between the one selected magazine 10 and the plurality of drives 101 using the disc carrier mechanism 202, for example, in the order determined so as to minimize the movement distance of the disc carrier mechanism 202.

The disc carrier mechanism 202 has been described, that is configured to minimize the movement distance of the disc carrier mechanism 202 for putting the discs 1 into the drives 101, by sequentially putting the discs 1 stored in the magazine 10 into the drives 101, from the lowermost disc 1. The operation of the disc carrier mechanism is not limited thereto. The disc carrier mechanism 202 may be configured to minimize the movement distance of the disc carrier mechanism 202 for the putting the discs 1 into the drives 101, for example, by sequentially putting the discs 1 into the drives 101 from the uppermost disc 1. The disc carrier mechanism 202 may be configured such that the movement distance of the disc carrier mechanism 202 for putting the discs 1 into the drives 101 is determined by the order of the drives 101 into which the discs 1 are put. Even in these cases, the controller 215 can reduce the movement distance of the disc carrier mechanism 202 to put the discs 1 into the drives 101, by reordering the commands according to the criterion corresponding to its operation.

It is not necessary to minimize the movement distance of the disc carrier mechanism 202 for putting the discs 1 into the drives 101 by reordering the commands. It is only necessary to reduce the movement distance of the disc carrier mechanism 202 for putting the discs 1 into the drives 101 by reordering the commands, relative to a movement distance achieved when not reordering the commands. In this case, the controller 215 determines the order of executing the commands so as to reduce the movement distance of the disc carrier mechanism 202, relative to a movement distance achieved when the discs 1 designated by the extracted commands are moved in an order in which the receiving circuit 213 has received the plurality of commands. In the determined order, the controller 215 moves the discs 1 designated by the extracted commands between the one selected magazine 10 and the plurality of drives 101 using the disc carrier mechanism 202.

The case of putting the discs 1 into the drives 101 has been described above, it is also possible to similarly determine the order of executing commands in the case of picking up the discs 1 from the drives 101.

Instead of minimizing or reducing the movement distance of the disc carrier mechanism 202, the controller 215 may reorder the commands so as to minimize or reduce the movement duration for the disc carrier mechanism 202 to move the discs 1.

(6) Determination of Order of Transport Magazines

Next, a case is described where, the controller 215 selects one disc number from the disc numbers registered in the command list 400 at step S3 of FIG. 7 described above, when the disc numbers of a plurality of different magazines 10 are registered with the command list 400.

The controller 215 acquires the current position of the magazine carrier mechanism 201. It is assumed that the current position of the magazine carrier mechanism 201 is either of the magazine storing positions in the magazine rack 100 or the hand-over position in the vicinity of the disc carrier mechanism 202. For ease of explanation, hereinafter, when the current position of the magazine carrier mechanism 201 is any one of the magazine storing positions, this position will be denoted as "magazine 10-$m$". For each of the disc numbers included in the transport parameters of the commands registered with the command list 400, the controller 215 acquires the magazine storing position of the magazine 10 storing the disc 1 by referring to the magazine information 500. In the example of the command list 400 of FIG. 4, the controller 215 acquires the magazines 10-1 and 10-2 as the magazine storing positions. The controller 215 selects the magazine 10 closest to the current position of the magazine carrier mechanism 201.

Figure 11:
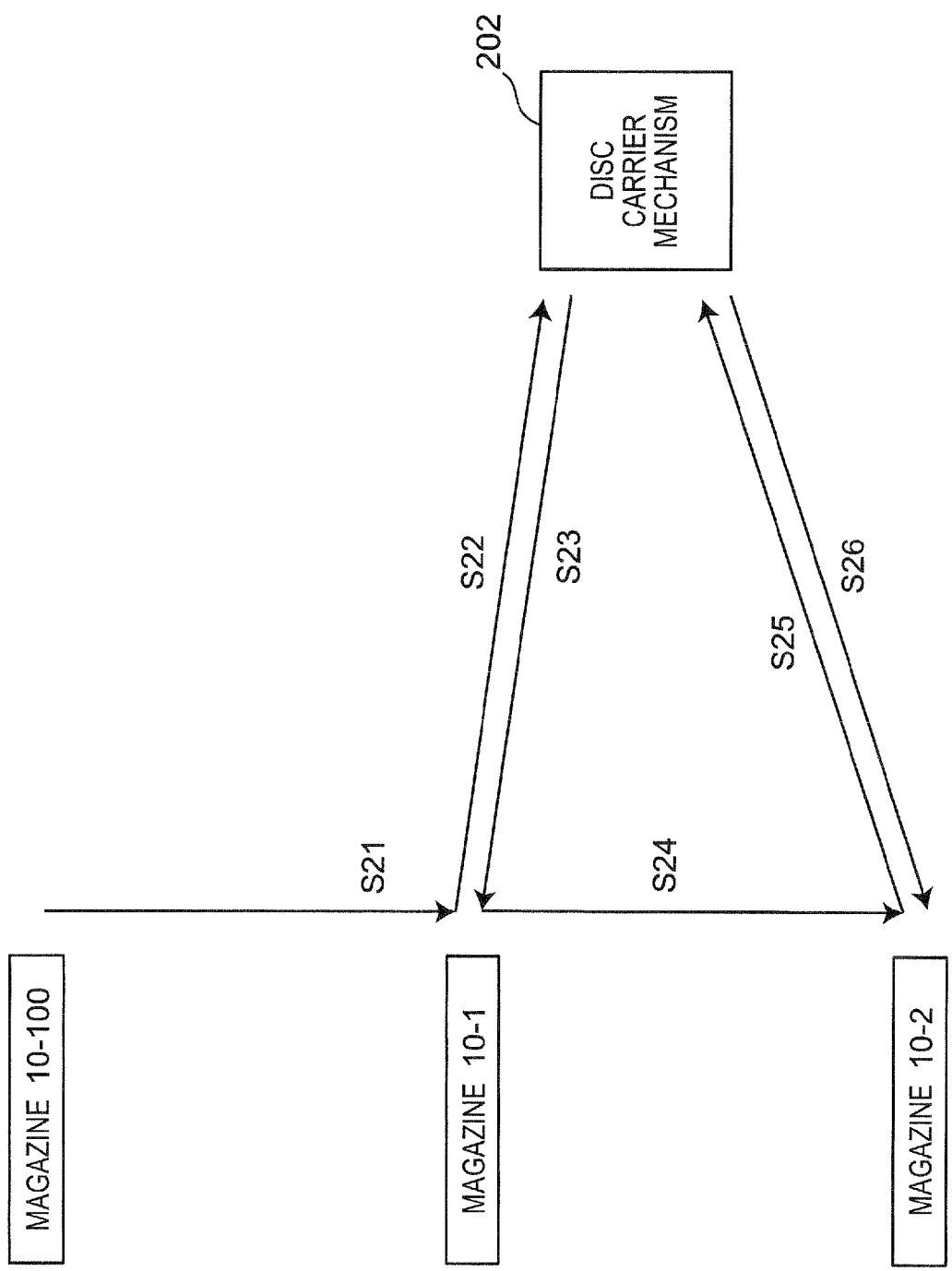
FIG. 11 is a diagram of an example in which an order of transporting the magazines 10-1 and 10-2 is determined so as to minimize the movement distance of a magazine carrier mechanism 201 to move the magazines 10-1 and 10-2 from a magazine rack 100 to the drives 101.
Figure 12:
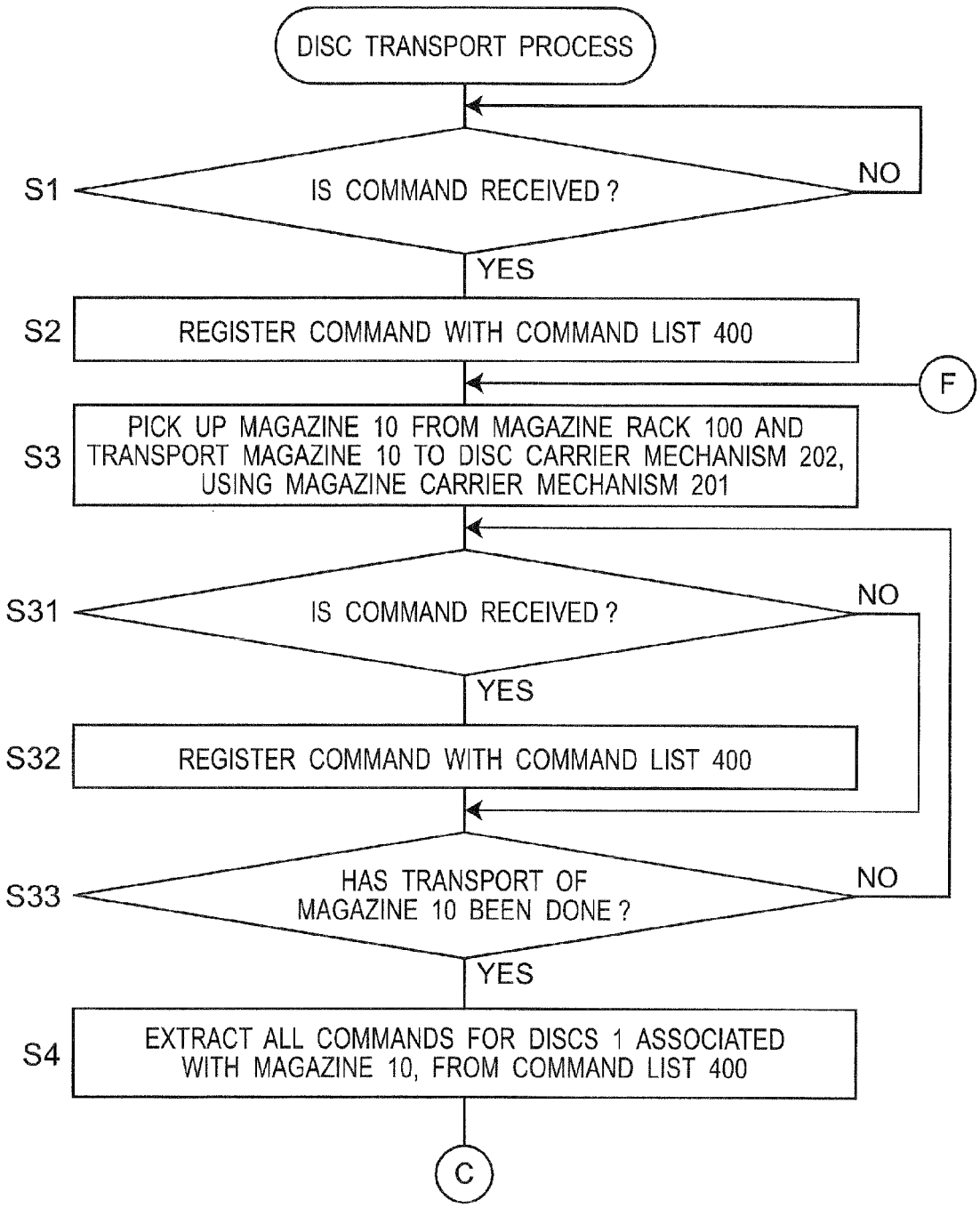
FIG. 12 is a flowchart of a first portion of a disc transport process according to a second embodiment.
Figure 13:
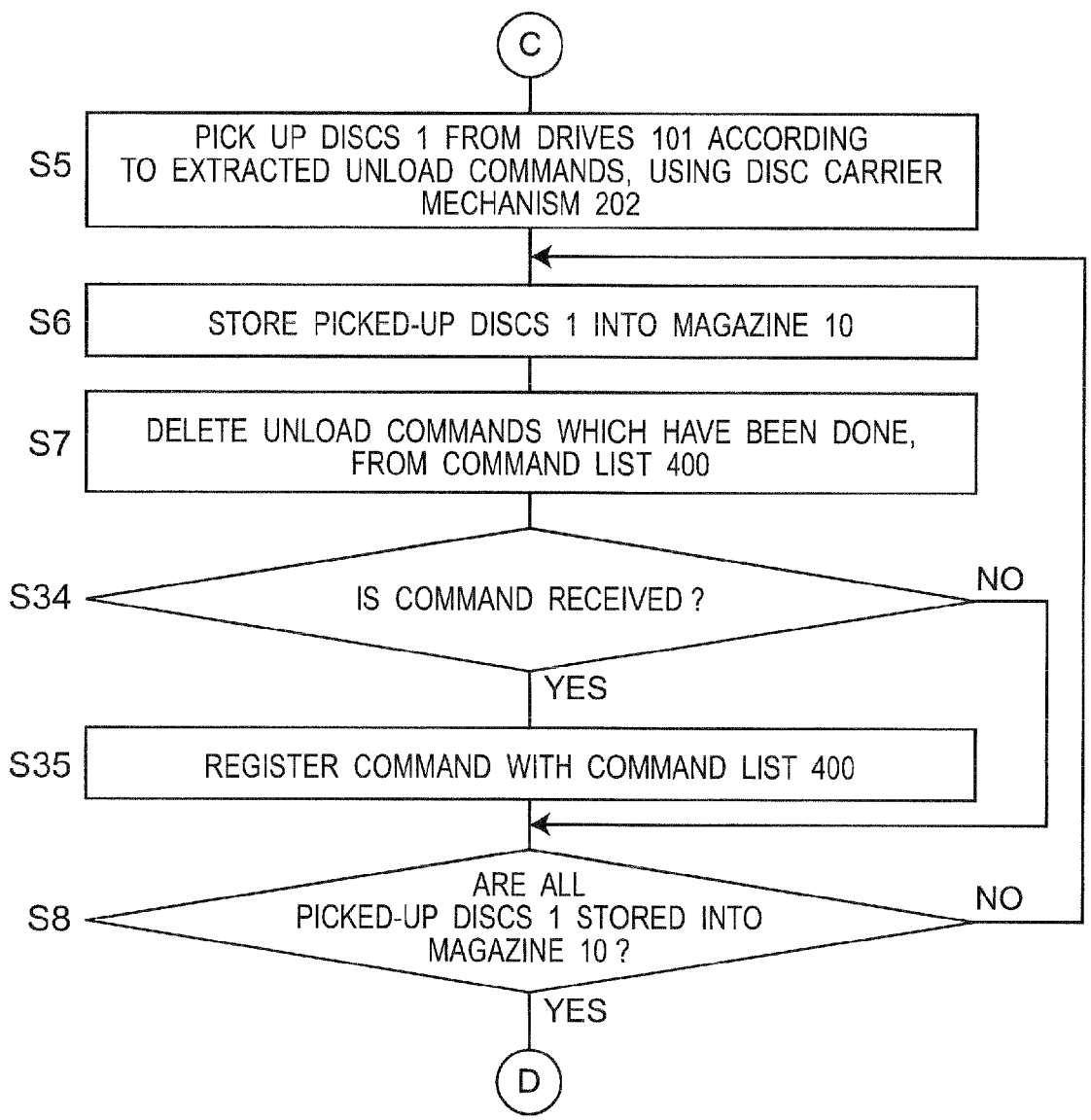
FIG. 13 is a flowchart of a second portion of the disc transport process according to the second embodiment.
Figure 14:
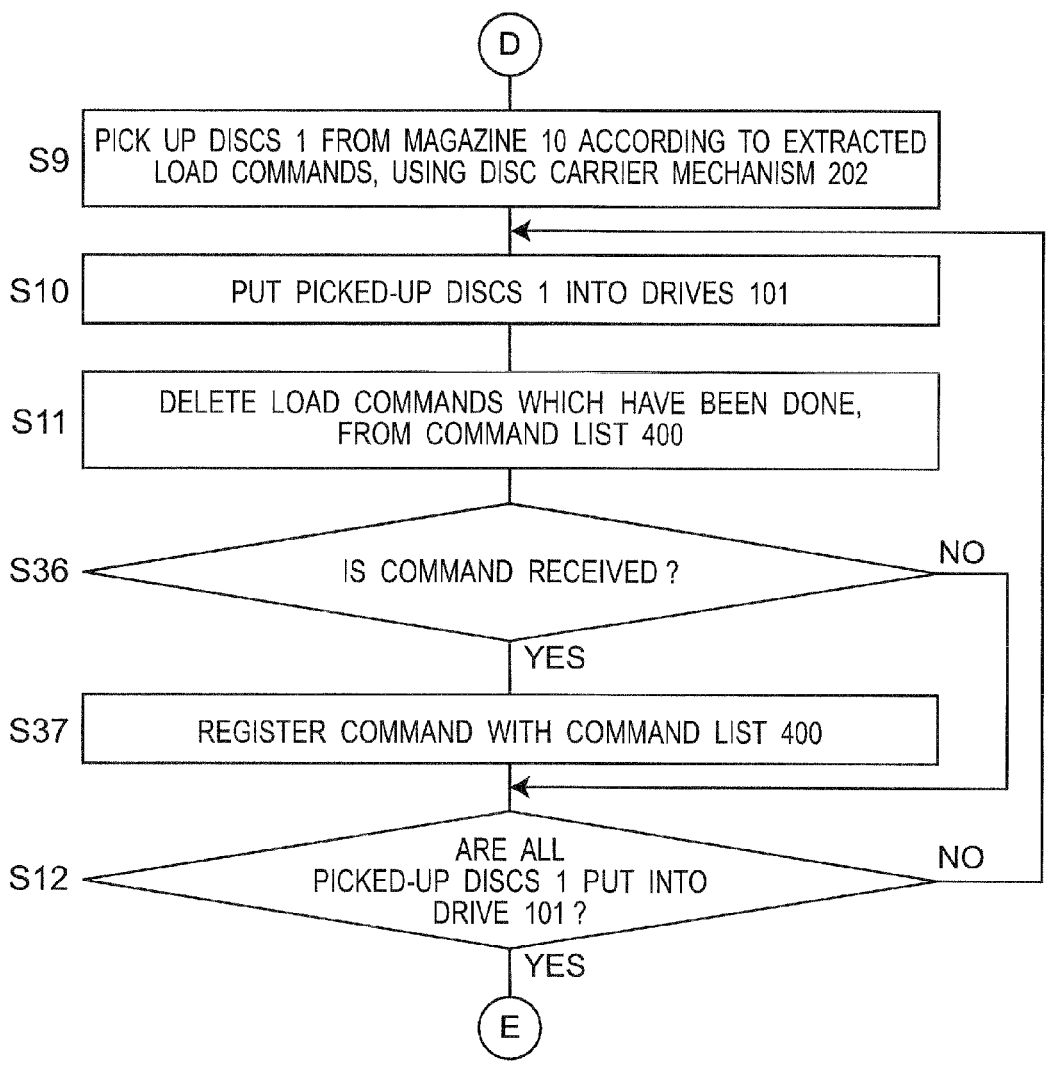
FIG. 14 is a flowchart of a third portion of the disc transport process according to the second embodiment.
Figure 15:
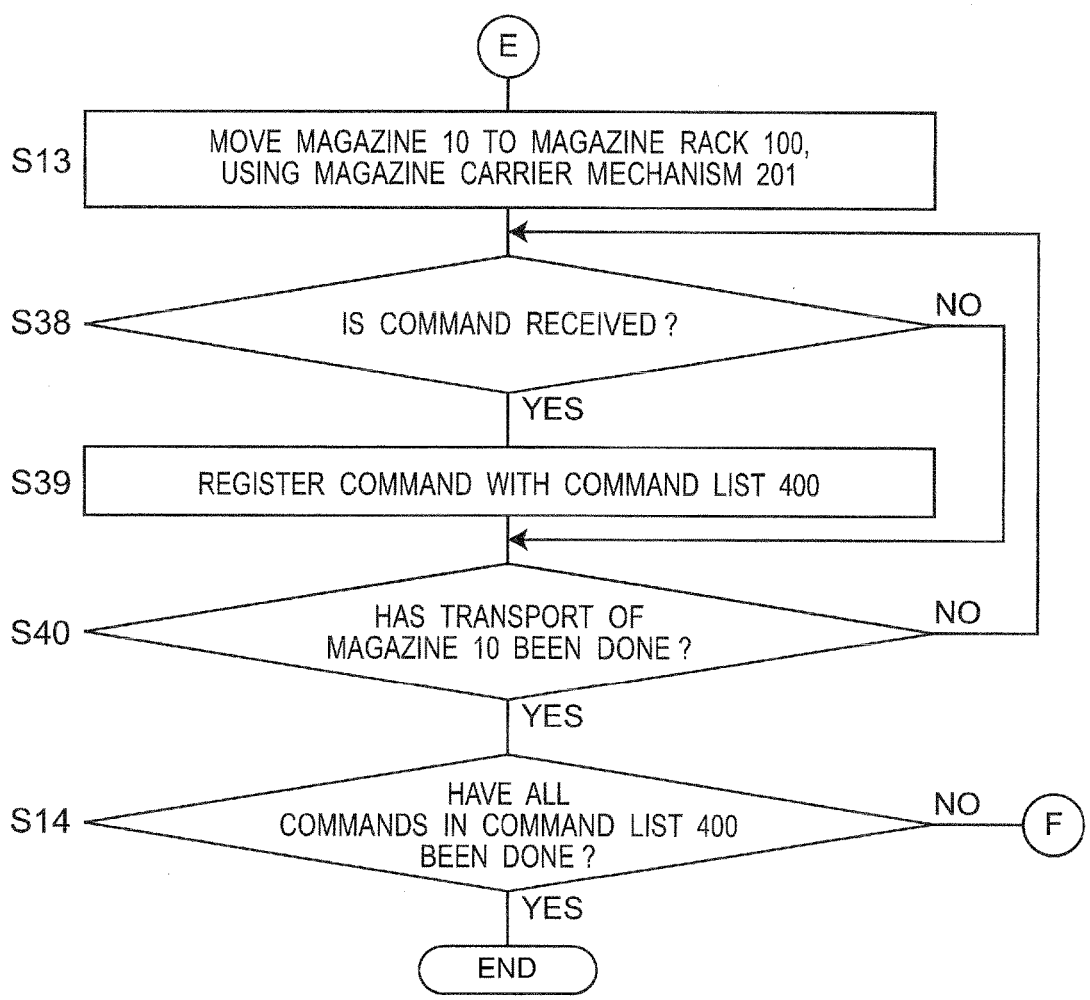
FIG. 15 is a flowchart of a fourth portion of the disc transport process according to the second embodiment.

FIG. 11 is a diagram of an example in which an order of transporting the magazines 10-1 and 10-2 is determined so as to minimize the movement distance of the magazine carrier mechanism 201 to move the magazines 10-1 and 10-2 from the magazine rack 100 to the drives 101. FIG. 11 shows an example of the order of transporting the magazines 10 of the case where the magazines 10 to be transported are determined according to the above method. The order of operations of the magazine carrier mechanism 201 will be described below for the case where the magazine carrier mechanism 201 is currently positioned at the position of the magazine 10-100, and the magazines 10-1 and 10-2 are registered with the command list 400 as the magazine numbers.

Step S21: The controller 215 selects the magazine 10-1 closest to the current position of the magazine carrier mechanism 201 (the magazine 10-100), from the magazines 10 each storing the discs 1 registered with the command list 400, and instructs the magazine carrier mechanism 201 to transport the magazine 10-1. The magazine carrier mechanism 201 moves to the front of the magazine holder storing the magazine 10-1 into the magazine rack 100.

Step S22: The magazine carrier mechanism 201 picks up the magazine 10-1 from the magazine holder of the magazine rack 100, and transports the magazine 10-1 to the hand-over position in the vicinity of the disc carrier mechanism 202. The disc carrier mechanism 202 hands over the discs 1 stored or to be stored in the magazine 10-1 at the hand-over position.

Step S23: The magazine carrier mechanism 201 returns the magazine 10-1 to its original position in the magazine rack 100.

Step S24: The controller 215 instructs the magazine carrier mechanism 201 to transport the magazine 10-2. The magazine carrier mechanism 201 moves to the front of the magazine holder of the magazine rack 100 storing the magazine 10-2.

Step S25: The magazine carrier mechanism 201 picks up the magazine 10-2 from the magazine holder of the magazine rack 100, and transports the magazine 10-2 to the hand-over position in the vicinity of the disc carrier mechanism 202. The disc carrier mechanism 202 hands over the discs 1 stored or to be stored in the magazine 10-2 at the hand-over position.

Step S26: The magazine carrier mechanism 201 returns the magazine 10-2 to its original position in the magazine rack 100.

As above, the controller 215 sequentially moves at least two magazines 10 of the plurality of magazines 10 between the storing positions of the at least two magazines 10 and the plurality of drives 101 using the magazine carrier mechanism 201, in the order determined so as to minimize the movement distance of the magazine carrier mechanism 201.

It is not necessary to minimize the movement distance of the magazine carrier mechanism 201. The controller 215 may determine the order of moving the magazines 10 so as to reduce the movement distance of the magazine carrier mechanism 201, relative to a movement distance achieved when at least two magazines 10 are moved in an order in which the receiving circuit 213 has received at least two commands designating the discs 1 stored in the at least two magazines 10 of the plurality of magazines 10. In this determined order, the controller 215 sequentially moves the at least two magazines 10 between the storing positions of the at least two magazines 10 and the plurality of drives 101 using the magazine carrier mechanism 201.

The controller 215 may determine the order of moving the magazines 10 so as to minimize or reduce the movement duration for the magazine carrier mechanism 201 to move the discs 1, instead of minimizing or reducing the movement distance of the magazine carrier mechanism 201.

Accordingly, it is possible to reduce the movement distance of the magazine carrier mechanism 201 to move the magazines 10. It is possible to extend the lifetime of the magazine carrier mechanism 201 by reducing the movement distance of the magazine carrier mechanism 201.

By using the method described in this embodiment, it is possible to reduce the number of the operations of the magazine carrier mechanism 201 and the disc carrier mechanism 202 for putting the plurality of discs 1 into the plurality of drives 101. In addition, it is possible to reduce the movement distance of the magazine carrier mechanism 201 and the disc carrier mechanism 202. Accordingly, it is possible to extend the lifetime of the optical disc library apparatus 200.

(7) Effect of First Embodiment

The configurations and the effects of the changer apparatus and the disc library apparatus according to the first embodiment are as follows.

The changer apparatus according to the first embodiment is the changer apparatus 220 for the optical disc library apparatus 200 that includes the plurality of drives 101, and the plurality of discs 1 stored in the plurality of magazines 10. Each of the plurality of magazines 10 are stored at the predetermined storing position in the optical disc library apparatus 200. The changer apparatus 220 includes the carrier mechanism, the receiving circuit 213, the memory 214, and the controller 215. The carrier mechanism moves one selected magazine 10 of the plurality of magazines 10 between the storing position of the one selected magazine 10 and the plurality of drives 101, and moves at least one disc 1 stored in the one selected magazine 10 between the one selected magazine 10 and the plurality of drives 101. The receiving circuit 213 receives the plurality of commands including the load command to load one of the plurality of discs 1 on one of the plurality of drives 101, and the unload command to unload one of the plurality of discs 1 from one of the plurality of drives 101. The memory 214 retains the command list 400 including the contents of the plurality of commands, and retains the magazine information 500 including the storing positions of the plurality of magazines 10 and the identification information on the plurality of discs 1 stored in the plurality of magazines 10. The controller 215 controls the carrier mechanism based on the command list 400 and the magazine information 500. The controller 215 selects one command of the plurality of commands included in the command list 400. The controller 215 selects one magazine 10 that stores the one disc 1 that is designated by the one selected command, based on the magazine information 500. The controller 215 moves the one selected magazine 10 between the storing position of the one selected magazine 10 and the plurality of drives 101, using the carrier mechanism. The controller 215 extracts all the commands designating the discs 1 stored in the one selected magazine 10, from the command list 400, based on the magazine information 500. The controller 215 moves all the discs 1 designated by the extracted commands between the one selected magazine 10 and the plurality of drives 101, using the carrier mechanism.

Thus, it is possible to provide the data library apparatus having longer lifetime than that of the conventional data library apparatus, by reducing the number of the operations of the carrier mechanism and reducing the movement distance of the carrier mechanism.

In addition, it is also possible to reduce the movement duration of the carrier mechanism, by reducing the number of the operations of the carrier mechanism and reducing the movement distance of the carrier mechanism.

According to the changer apparatus of the first embodiment, the carrier mechanism includes the magazine carrier mechanism 201 and the disc carrier mechanism 202. The magazine carrier mechanism 201 moves one selected magazine 10 of the plurality of magazines 10 between the storing position of the one selected magazine 10 and the plurality of drives 101. The disc carrier mechanism 202 moves at least one disc 1 stored in the one selected magazine 10 between the one selected magazine 10 and the plurality of drives 101.

Thus, it is possible to separate the mechanism for transporting the magazines 10 and the mechanism for transporting the discs 1 from each other, and provide a flexible carrier mechanism.

According to the changer apparatus of the first embodiment, the controller 215 moves the discs 1 designated by the extracted commands between the one selected magazine 10 and the plurality of drives 101 using the disc carrier mechanism 202, in the order determined so as to reduce the movement distance of the disc carrier mechanism 202, relative to the movement distance achieved when the discs 1 designated by the extracted commands are moved in the order in which the receiving circuit 213 has received the plurality of commands.

Thus, it is possible to provide the data library apparatus having longer lifetime than that of the conventional data library apparatus, by reducing the movement distance of the carrier mechanism.

According to the changer apparatus of the first embodiment, the controller 215 moves the discs 1 designated by the extracted commands between the one selected magazine 10 and the plurality of drives 101 using the disc carrier mechanism 202, in the order determined so as to minimize the movement distance of the disc carrier mechanism 202.

Thus, it is possible to provide the data library apparatus having longer lifetime than that of the conventional data library apparatus, by reducing the movement distance of the carrier mechanism.

According to the changer apparatus of the first embodiment, the controller 215 sequentially moves at least two magazines 10 between the storing positions of the at least two magazines 10 and the plurality of drives 101 using the magazine carrier mechanism 201, in the order determined so as to reduce the movement distance of the magazine carrier mechanism 202, relative to the movement distance achieved when the at least two magazines 10 are moved in the order in which the receiving circuit 213 has received at least two commands designating the discs 1 stored in the at least two magazines 10 of the plurality of magazines 10.

Thus, it is possible to provide the data library apparatus having longer lifetime than that of the conventional data library apparatus, by reducing the movement distance of the carrier mechanism.

According to the changer apparatus of the first embodiment, the controller 215 sequentially moves at least two magazines 10 of the plurality of magazines 10 between the storing positions of the at least two magazines 10 and the plurality of drives 101 using the magazine carrier mechanism 201, in the order determined so as to minimize the movement distance of the magazine carrier mechanism 201.

Thus, it is possible to provide the data library apparatus having longer lifetime than that of the conventional data library apparatus, by reducing the movement distance of the carrier mechanism.

The optical disc library apparatus 200 according to the first embodiment includes the plurality of drives 101, the plurality of discs 1 stored in the plurality of magazines 10, and the changer apparatus 220 according to the first embodiment.

Thus, it is possible to provide the data library apparatus having longer lifetime than that of the conventional data library apparatus, by reducing the number of the operations of the carrier mechanism and reducing the movement distance of the carrier mechanism.

Second Embodiment

The second embodiment will be described below with reference to FIGS. 12 to 15.

In this embodiment, a method will be described in which the plurality of discs 1 are loaded or unloaded on/from the drives 101 while transporting the magazine 10 only once, by receiving commands instructing to put the discs 1 into the drives 101 even while the magazine carrier mechanism 201 is moving the magazines 10, or even while the disc carrier mechanism 202 is moving the discs 1. This embodiment is the same as the first embodiment except for steps of receiving the commands. The detailed description on the same elements and steps as the first embodiment will be omitted, and only steps of receiving the commands will be described below.

FIGS. 12 to 15 are flowcharts of a first to a fourth portions of a disc transport process according to the second embodiment. Steps S1 to S14 of FIGS. 12 to 15 are the same as the corresponding steps of FIGS. 7 and 8.

When the magazine carrier mechanism 201 moves the magazine 10 from the magazine rack 100 to the hand-over position in the vicinity of the disc carrier mechanism 202, commands may be received. At step S31 after step S3, the receiving circuit 213 determines whether or not the receiving circuit 213 receives any command; if YES, the process proceeds to step S32; if NO, the process proceeds to step S33. At step S32, the receiving circuit 213 registers the command with the command list 400. Steps S31 and S32 are substantially the same as steps S1 and S2. At step S33, the receiving circuit 213 determines whether or not the transport of the magazine 10 has been done; if YES, the process proceeds to step S4; if NO, the process returns to step S31.

When the disc carrier mechanism 202 picks up the discs 1 from the drives 101 and stores the discs 1 into the magazine 10, commands may be received. At step S34 after step S7, the receiving circuit 213 determines whether or not the receiving circuit 213 receives any command; if YES, the process proceeds to step S35; if NO, the process proceeds to step S8. At step S35, the receiving circuit 213 registers the command with the command list 400, and the process proceeds to step S8. Steps S34 and S35 are substantially the same as steps S1 and S2.

When the disc carrier mechanism 202 picks up the discs 1 from the magazine 10 and puts the discs 1 into the drives 101, commands may be received. At step S36 after step S7, the receiving circuit 213 determines whether or not the receiving circuit 213 receives any command; if YES, the process proceeds to step S37; if NO, the process proceeds to step S12. At step S37, the receiving circuit 213 registers the command with the command list 400, and the process proceeds to step S12. Steps S36 and S37 are substantially the same as steps S1 and S2.

When the magazine carrier mechanism 201 moves the magazine 10 from the hand-over position in the vicinity of the disc carrier mechanism 202 to the magazine rack 100, commands may be received. At step S38 after step S13, the receiving circuit 213 determines whether or not the receiving circuit 213 receives any command; if YES, the process proceeds to step S39; if NO, the process proceeds to step S40. At step S39, the receiving circuit 213 registers the command with the command list 400. Steps S38 and S39 are substantially the same as steps S1 and S2. At step S40, the receiving circuit 213 determines whether or not the transport of the magazine 10 has been done; if YES, the process proceeds to step S14; if NO, the process proceeds to step S38.

The commands registered with the command list 400 at steps S32, S35, S37, and S39 are then extracted from the command list 400 when executing step S4.

By using the method described in this embodiment, it is possible to reduce the number of the operations of the magazine carrier mechanism 201 and the disc carrier mechanism 202 for putting the plurality of discs 1 into the plurality of drives 101. It is also possible to reduce the movement distance of the magazine carrier mechanism 201 and the disc carrier mechanism 202. Accordingly, it is possible to extend the lifetime of the optical disc library apparatus 200.

The configuration and the effects of the changer apparatus and the disc library apparatus according to the second embodiment are as follows.

According to the changer apparatus and the disc library apparatus of the second embodiment, when the controller 215 moves the magazine 10 or the disc 1 using the carrier mechanism, the receiving circuit 213 receives at least one command, and adds the content of the at least one command to the command list retained in the memory 214.

Thus, it is possible to quickly process any command newly arriving at the optical disc library apparatus 200 from the management server apparatus 301, while reducing the number of the operations of the carrier mechanism and reducing the movement distance of the carrier mechanism.

Other Embodiments

The first and second embodiments have been described above as examples of the techniques disclosed by this application. However, the techniques of this disclosure are not limited thereto, and are applicable to embodiments with appropriate modification, replacement, addition, omission, and so on. The elements described in the first and second embodiments can be combined to form a new embodiment.

This disclosure is applicable to a changer apparatus and a data library apparatus, using arbitrary storage media configured to be stored in a plurality of magazines, not limited to an optical disc.

The embodiments have been described as examples of the techniques in this disclosure. The accompanying drawings and the detailed description have been provided for this purpose.

Therefore, the elements described in the accompanying drawings and the detailed description may include not only the elements essential for solving the problem, but also elements exemplarily describing the techniques and not essential for solving the problem. Therefore, even though these non-essential elements are included in the accompanying drawings and the detailed description, these non-essential elements should not immediately be recognized as being essential.

Since the embodiments described above are intended to exemplarily describe the techniques of this disclosure, various modifications, replacements, additions, and omissions can be made within the claims and the scope equivalent thereto.

The changer apparatus according to this disclosure is useful for a data library apparatus for use in archives and so on, using portable information recording media, such as optical discs.

The invention claimed is:

1. A changer apparatus for a data library apparatus that comprises a plurality of recorder and player apparatuses and a plurality of recording media stored in a plurality of magazines,
wherein each of the plurality of magazines are stored at a predetermined storing position of the data library apparatus,
wherein the changer apparatus comprises:
a carrier mechanism that moves one selected magazine of the plurality of magazines between the storing position of the one selected magazine and the plurality of recorder and player apparatuses, and that moves at least one recording medium stored in the one selected magazine between the one selected magazine and the plurality of recorder and player apparatuses;
a receiving circuit that receives a plurality of commands including a load command to load one of the plurality of recording media on one of the plurality of recorder and player apparatuses, and an unload command to unload one of the plurality of recording media from one of the plurality of recorder and player apparatuses;
a memory that retains a command list comprising contents of the plurality of commands, and that retains magazine information comprising the storing positions of the plurality of magazines and identification information on the plurality of recording media stored in the plurality of magazines; and
a controller that controls the carrier mechanism based on the command list and the magazine information,
wherein the controller selects one command of the plurality of commands included in the command list,
wherein the controller selects one magazine that stores therein one recording medium designated by the one selected command, based on the magazine information,
wherein the controller moves the one selected magazine between the storing position of the one selected magazine and the plurality of recorder and player apparatuses using the carrier mechanism,
wherein the controller extracts all commands designating recording media stored in the one selected magazine, from the command list, based on the magazine information, and
wherein the controller moves all the recording media designated by the extracted commands between the one selected magazine and the plurality of recorder and player apparatuses using the carrier mechanism.

2. The changer apparatus as claimed in claim 1,
wherein the carrier mechanism comprises:
a first carrier mechanism that moves the one selected magazine of the plurality of magazines between the storing position of the one selected magazine and the plurality of recorder and player apparatuses; and
a second carrier mechanism that moves at least one recording medium stored in the one selected magazine between the one selected magazine and the plurality of recorder and player apparatuses.

3. The changer apparatus as claimed in claim 2,
wherein the controller moves the recording media designated by the extracted commands between the one selected magazine and the plurality of recorder and player apparatuses using the second carrier mechanism, in an order determined so as to reduce a movement distance of the second carrier mechanism, relative to a movement distance achieved when the recording media designated by the extracted commands are moved in an order in which the receiving circuit has received the plurality of commands.

4. The changer apparatus as claimed in claim 2,
wherein the controller moves the recording media designated by the extracted commands between the one selected magazine and the plurality of recorder and player apparatuses using the second carrier mechanism, in an order determined so as to minimize a movement distance of the second carrier mechanism.

5. The changer apparatus as claimed in claim 2,
wherein the controller sequentially moves at least two magazines of the plurality of magazines between the storing positions of the at least two magazines and the plurality of recorder and player apparatuses using the first carrier mechanism, in an order determined so as to reduce a movement distance of the first carrier mechanism, relative to a movement distance achieved when the at least two magazines are moved in an order in which the receiving circuit has received at least two commands designating the recording media stored in the at least two magazines.

6. The changer apparatus as claimed in claim 2,
wherein the controller sequentially moves at least two magazines of the plurality of magazines between the storing positions of the at least two magazines and the plurality of recorder and player apparatuses using the first carrier mechanism, in an order determined so as to minimize a movement distance of the first carrier mechanism.

7. The changer apparatus as claimed in claim 1,
wherein when the controller moves the magazines or the recording media using the carrier mechanism, the receiving circuit receives at least one command and adds a content of the at least one command to the command list retained by the memory.

8. A data library apparatus comprising:
a plurality of recorder and player apparatuses;
a plurality of recording media stored in a plurality of magazines; and
a changer apparatus, wherein each of the plurality of magazines are stored at a predetermined storing position of the data library apparatus, wherein the changer apparatus comprises:

a carrier mechanism that moves one selected magazine of the plurality of magazines between the storing position of the one selected magazine and the plurality of recorder and player apparatuses, and that moves at least one recording medium stored in the one selected magazine between the one selected magazine and the plurality of recorder and player apparatuses;

a receiving circuit that receives a plurality of commands including a load command to load one of the plurality of recording media on one of the plurality of recorder and player apparatuses, and an unload command to unload one of the plurality of recording media from one of the plurality of recorder and player apparatuses;

a memory that retains a command list comprising contents of the plurality of commands, and that retains magazine information comprising the storing positions of the plurality of magazines and identification information on the plurality of recording media stored in the plurality of magazines; and a controller that controls the carrier mechanism based on the command list and the magazine information, wherein the controller selects one command of the plurality of commands included in the command list, wherein the controller selects one magazine that stores therein one recording medium designated by the one selected command, based on the magazine information, wherein the controller moves the one selected magazine between the storing position of the one selected magazine and the plurality of recorder and player apparatuses using the carrier mechanism, wherein the controller extracts all commands designating recording media stored in the one selected magazine, from the command list, based on the magazine information, and wherein the controller moves all the recording media designated by the extracted commands between the one selected magazine and the plurality of recorder and player apparatuses using the carrier mechanism.

* * * * *